United States Patent
Shoji et al.

(10) Patent No.: US 12,459,371 B2
(45) Date of Patent: Nov. 4, 2025

(54) MOTOR CONTROL DEVICE

(71) Applicant: JTEKT CORPORATION, Kariya (JP)

(72) Inventors: Naoki Shoji, Shiki-gun (JP); Mitsuko Yoshida, Nara (JP); Robert Fuchs, Nara (JP)

(73) Assignee: JTEKT CORPORATION, Kariya (JP)

( * ) Notice: Subject to any disclaimer, the term of this patent is extended or adjusted under 35 U.S.C. 154(b) by 29 days.

(21) Appl. No.: 18/571,161

(22) PCT Filed: Jun. 28, 2022

(86) PCT No.: PCT/JP2022/025820
§ 371 (c)(1),
(2) Date: Dec. 15, 2023

(87) PCT Pub. No.: WO2023/286592
PCT Pub. Date: Jan. 19, 2023

(65) Prior Publication Data
US 2024/0278650 A1    Aug. 22, 2024

(30) Foreign Application Priority Data

Jul. 13, 2021    (WO) .................. PCT/JP2021/026332

(51) Int. Cl.
*B60L 15/20*    (2006.01)

(52) U.S. Cl.
CPC .......... *B60L 15/20* (2013.01); *B60L 2240/24* (2013.01); *B60L 2240/423* (2013.01)

(58) Field of Classification Search
CPC ............... B60L 15/20; B60L 2240/24; B60L 2240/423; B62D 5/0463; B62D 6/008;
(Continued)

(56) References Cited

U.S. PATENT DOCUMENTS

| | | |
|---|---|---|
| 6,212,453 B1 | 4/2001 | Kawagoe et al. |
| 11,267,506 B2 | 3/2022 | Moreillon et al. |
| | (Continued) | |

FOREIGN PATENT DOCUMENTS

| | | |
|---|---|---|
| EP | 3 798 099 A1 | 3/2021 |
| JP | H11-073597 A | 3/1999 |
| | (Continued) | |

OTHER PUBLICATIONS

Sep. 6, 2022 International Search Report issued in International Patent Application No. PCT/JP2022/025820.
(Continued)

*Primary Examiner* — Behrang Badii
(74) *Attorney, Agent, or Firm* — Oliff PLC

(57) ABSTRACT

A motor control unit includes: an assist torque command value generation unit that generates an assist torque command value using steering torque; a manual steering command value generation unit that generates a manual steering command value using the steering torque and the assist torque command value; an integrated angle command value calculation unit that calculates an integrated angle command value by adding the manual steering command value to an automatic steering command value; and a switching unit that switches between a first control for controlling an electric motor based on the assist torque command value and a second control for controlling the electric motor based on the integrated angle command value, based on a switching signal.

8 Claims, 10 Drawing Sheets

(58) Field of Classification Search
CPC ... B62D 15/025; H02P 21/0003; H02P 21/13; H02P 21/20
See application file for complete search history.

(56) References Cited

U.S. PATENT DOCUMENTS

| | | | |
|---|---|---|---|
| 2014/0222295 A1* | 8/2014 | Dornhege | B62D 6/002 |
| | | | 701/42 |
| 2015/0057889 A1 | 2/2015 | Tamaizumi et al. | |
| 2015/0344066 A1 | 12/2015 | Tsubaki et al. | |
| 2017/0015322 A1* | 1/2017 | Saito | B60W 10/18 |
| 2019/0039642 A1 | 2/2019 | Minaki et al. | |
| 2019/0161116 A1 | 5/2019 | Moreillon et al. | |
| 2019/0210638 A1* | 7/2019 | Ueno | B62D 6/00 |
| 2019/0329818 A1 | 10/2019 | Shoji et al. | |
| 2020/0269906 A1 | 8/2020 | Nakade et al. | |
| 2020/0398893 A1 | 12/2020 | Shoji et al. | |
| 2021/0253161 A1 | 8/2021 | Yoshida et al. | |
| 2022/0063713 A1 | 3/2022 | Shoji et al. | |

FOREIGN PATENT DOCUMENTS

| | | |
|---|---|---|
| JP | 2018-154334 A | 10/2018 |
| JP | 2018-183046 A | 11/2018 |
| JP | 2019-098817 A | 6/2019 |
| JP | 2019-194059 A | 11/2019 |
| WO | 2019/225289 A1 | 11/2019 |

OTHER PUBLICATIONS

Dec. 6, 2024 extended Search Report issued in European Patent Application No. 22841936.2.
Jul. 24, 2025 Office Action issued in U.S. Appl. No. 18/705,206.
Sep. 4, 2025 Office Action issued in Japanese Patent Application No. 2023-557616.

* cited by examiner

MOTOR CONTROL DEVICE

TECHNICAL FIELD

The present invention relates to control devices for electric motors for steering angle control.

BACKGROUND ART

Patent Document 1 below discloses a motor control device that performs an angle feedback control on an electric motor based on an integrated angle command value obtained by adding a manual steering command value to an automatic steering command value. Patent Document 1 also discloses that the integrated angle command value is calculated by adding an automatic steering command value after a first weighting process and a manual steering command value after a second weighting process.

RELATED ART DOCUMENTS

Patent Documents

Patent Document 1: Japanese Unexamined Patent Application Publication No. 2019-194059 (JP 2019-194059 A)

SUMMARY OF THE INVENTION

Problem to be Solved by the Invention

In the motor control device described in Patent Document 1, a disturbance torque estimation unit (disturbance observer) estimates disturbance torque including road load torque, a steering angle, etc. A basic torque command value is calculated by performing a proportional-derivative calculation etc. on the deviation between the integrated angle command value and the estimated steering angle value calculated by the disturbance torque estimation unit. A steering torque command value is calculated by subtracting the estimated disturbance torque value calculated by the disturbance torque estimation unit from the basic torque command value. The steering torque command value, namely the basic torque command value minus the disturbance torque (road load torque), is thus obtained. A motor torque command value is calculated by dividing the steering torque command value by a reduction ratio.

In the motor control device described in Patent Document 1, the disturbance torque (road surface load torque) is subtracted from the basic torque command value. Instead, a manual steering command value generation unit generates the manual steering command value by considering virtual road load. In the motor control device described in Patent Document 1, the electric motor can be controlled based on the manual steering command value generated by the manual steering command value generation unit. However, since the manual steering command value is generated by considering the virtual road load rather than actual road load, the driver cannot feel the actual road surface condition such as whether the road surface is slippery. Therefore, the driver may feel discomfort with steering.

It is an object of the present invention to provide a motor control device that can control an electric motor based on an integrated angle command value obtained by adding a manual steering command value to an automatic steering command value, and that can perform such a motor control that allows a driver to feel an actual road surface condition.

Means for Solving the Problem

One embodiment of the present invention provides a motor control device for drivingly controlling an electric motor for steering angle control. The motor control device includes: an assist torque command value generation unit that generates an assist torque command value using steering torque; a manual steering command value generation unit that generates a manual steering command value using the steering torque and the assist torque command value; an integrated angle command value calculation unit that calculates an integrated angle command value by adding the manual steering command value to an automatic steering command value; and a switching unit that switches between a first control for controlling the electric motor based on the assist torque command value and a second control for controlling the electric motor based on the integrated angle command value, based on a switching signal.

With this configuration, the motor control device that can control the electric motor based on the integrated angle command value obtained by adding the manual steering command value to the automatic steering command value can perform such a motor control that allows a driver to feel an actual road surface condition.

The above and other objects, features, and advantages of the present invention will become apparent from the following description of an embodiment that will be given with reference to the accompanying drawings.

MODES FOR CARRYING OUT THE INVENTION

Description of Embodiment of Invention

Figure 1:
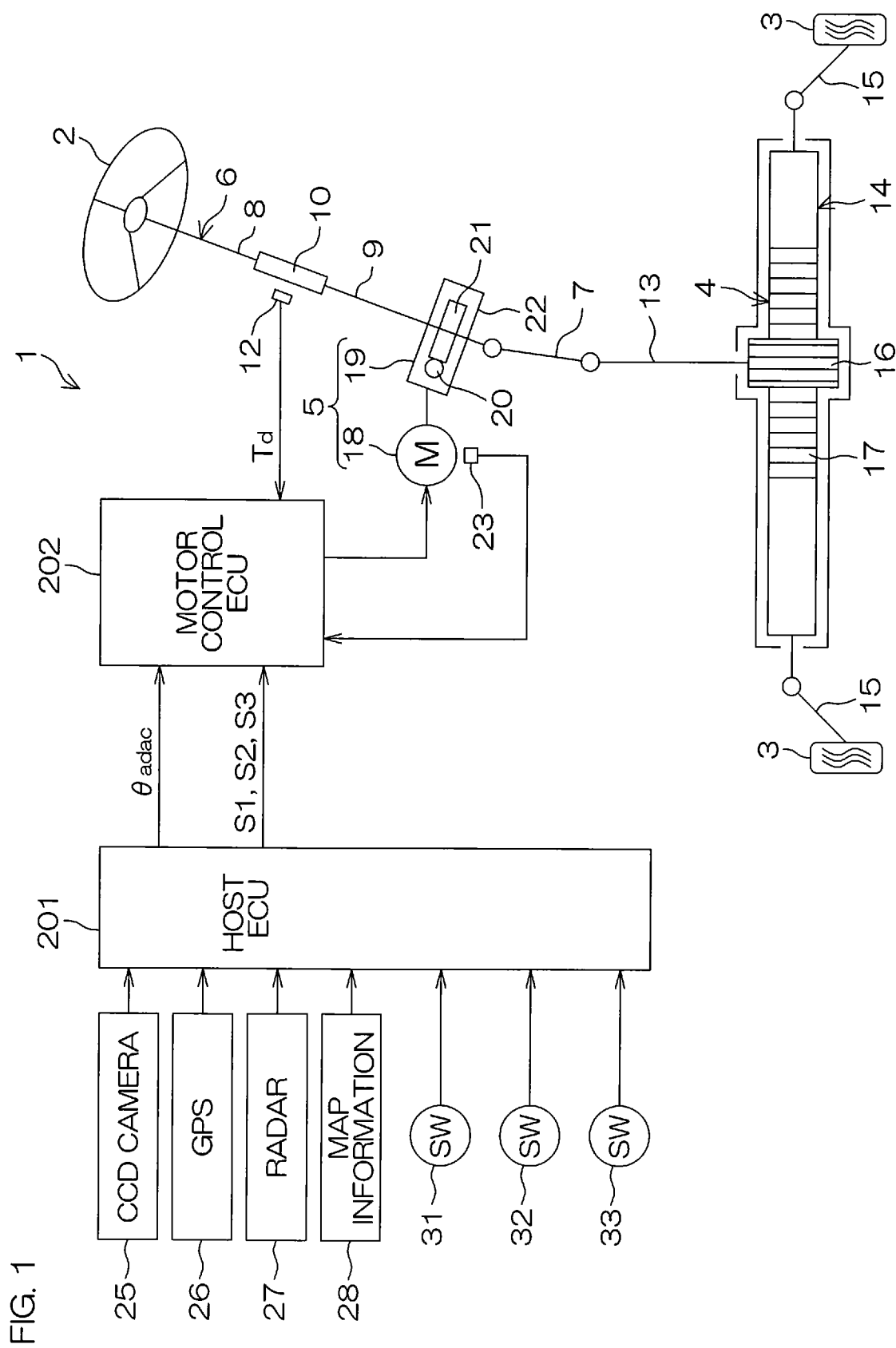
FIG. 1 is a schematic diagram showing a schematic configuration of an electric power steering system to which a motor control device according to an embodiment of the present invention is applied.

One embodiment of the present invention provides a motor control device for drivingly controlling an electric motor for steering angle control. The motor control device includes: an assist torque command value generation unit that generates an assist torque command value using steering torque; a manual steering command value generation unit that generates a manual steering command value using the steering torque and the assist torque command value; an integrated angle command value calculation unit that calculates an integrated angle command value by adding the manual steering command value to an automatic steering command value; and a switching unit that switches between a first control for controlling the electric motor based on the assist torque command value and a second control for controlling the electric motor based on the integrated angle command value, based on a switching signal.

With this configuration, the motor control device that can control the electric motor based on the integrated angle command value obtained by adding the manual steering command value to the automatic steering command value can perform such a motor control that allows a driver to feel an actual road load.

In one embodiment of the present invention, the switching unit includes: a first weighting unit that performs a first weighting process on the assist torque command value, based on the switching signal; a second weighting unit that performs a second weighting process on an integrated torque command value according to the integrated angle command value, based on the switching signal; and a motor torque command value calculation unit that calculates a motor torque command value based on the assist torque command value after the first weighting process and the integrated torque command value after the second weighting process.

In one embodiment of the present invention, the switching unit is configured to switch among the first control, the second control, and a third control for controlling the electric motor based on the automatic steering command value, based on the switching signal.

In one embodiment of the present invention, the switching unit includes: a first weighting unit that performs a first weighting process on the assist torque command value, based on the switching signal; a second weighting unit that performs a second weighting process on an integrated torque command value according to the integrated angle command value, based on the switching signal; a third weighting unit that performs a third weighting process on the manual steering command value, based on the switching signal; and a motor torque command value calculation unit that calculates a motor torque command value based on the assist torque command value after the first weighting process and the integrated torque command value after the second weighting process, and the integrated angle command value calculation unit is configured to calculate the integrated angle command value by adding the manual steering command value after the third weighting process to the automatic steering command value.

In one embodiment of the present invention, the switching unit includes: an addition unit that calculates a motor torque command value by adding the assist torque command value generated by the assist torque command value generation unit and an integrated torque command value according to the integrated angle command value calculated by the integrated angle command value calculation unit; a first switch that is located between the assist torque command value generation unit and the addition unit and that is turned on and off based on the switching signal; and a second switch that is located between the integrated angle command value calculation unit and the addition unit and that is turned on and off based on the switching signal.

In one embodiment of the present invention, the switching unit includes: an addition unit that calculates a motor torque command value by adding the assist torque command value generated by the assist torque command value generation unit and an integrated torque command value according to the integrated angle command value calculated by the integrated angle command value calculation unit; a first switch that is located between the assist torque command value generation unit and the addition unit and that is turned on and off based on the switching signal; a second switch that is located between the integrated angle command value calculation unit and the addition unit and that is turned on and off based on the switching signal; and a third switch that is located between the manual steering command value generation unit and the integrated angle command value calculation unit and that is turned on and off based on the switching signal.

In one embodiment of the present invention, a control unit that performs the second control includes an angle control unit that performs an angle control based on the integrated angle command value, and the angle control unit includes: a basic torque command value calculation unit that calculates a basic torque command value based on the integrated angle command value; a disturbance torque estimation unit that estimates disturbance torque other than motor torque of the electric motor that acts on an object to be driven by the electric motor; and a disturbance torque compensation unit that corrects the basic torque command value by the disturbance torque.

In one embodiment of the present invention, the disturbance torque estimation unit is configured to estimate the disturbance torque and a rotation angle of the object to be driven by using the motor torque command value and a rotation angle of the electric motor, and the basic torque command value calculation unit includes: an angle deviation calculation unit that calculates an angle deviation that is a difference between the integrated angle command value and the rotation angle of the object to be driven; and a feedback calculation unit that calculates the basic torque command value by performing a predetermined feedback calculation on the angle deviation.

In one embodiment of the present invention, the manual steering command value generation unit is configured to generate the manual steering command value using the assist torque command value, the steering torque, and a spring constant and a viscous damping coefficient that are for generating road load torque.

Detailed Description of Embodiment of Invention

An embodiment of the present invention will be described in detail below with reference to the accompanying drawings.

FIG. 1 is a schematic diagram showing a schematic configuration of an electric power steering system to which a motor control device according to an embodiment of the present invention is applied.

An electric power steering system 1 includes: a steering wheel 2 that is a steering member for steering a vehicle; a steering operation mechanism 4 that steers steered wheels 3 with rotation of the steering wheel 2; and a steering assist mechanism 5 that assists a driver in steering. The steering wheel 2 and the steering operation mechanism 4 are mechanically connected via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected via a torsion bar 10 so as to be relatively rotatable.

A torque sensor 12 is disposed near the torsion bar 10. The torque sensor 12 detects steering torque (torsion bar torque) $T_d$ applied to the steering wheel 2 based on the amount of relative rotational displacement between the input shaft 8 and the output shaft 9. In the present embodiment, the steering torque $T_d$ that is detected by the torque sensor 12 is such that, for example, the torque for steering to the left is detected as a positive value and the torque for steering to the right is detected as a negative value. It is herein assumed that the greater the absolute value of the steering torque $T_d$, the greater the magnitude thereof.

The steering operation mechanism 4 is a rack and pinion mechanism including a pinion shaft 13 and a rack shaft 14 that is a steered shaft. The steered wheels 3 are connected to the ends of the rack shaft 14 via tie rods 15 and knuckle arms (not shown). The pinion shaft 13 is connected to the intermediate shaft 7. The pinion shaft 13 is configured to rotate with steering of the steering wheel 2. A pinion 16 is connected to a distal end of the pinion shaft 13.

The rack shaft 14 extends linearly in the lateral direction of the vehicle. A rack 17 that meshes with the pinion 16 is formed on an intermediate portion in the axial direction of the rack shaft 14. The pinion 16 and the rack 17 convert rotation of the pinion shaft 13 to axial movement of the rack shaft 14. The steered wheels 3 can be steered by moving the rack shaft 14 in the axial direction.

When the steering wheel 2 is steered (rotated), this rotation is transmitted to the pinion shaft 13 via the steering shaft 6 and the intermediate shaft 7. The pinion 16 and the rack 17 convert rotation of the pinion shaft 13 to axial movement of the rack shaft 14. The steered wheels 3 are thus steered.

The steering assist mechanism 5 includes an electric motor 18 for generating a steering assist force (assist torque), and a speed reducer 19 for amplifying output torque of the electric motor 18 and transferring the amplified torque to the steering operation mechanism 4. The speed reducer 19 is a worm gear mechanism including a worm gear 20 and a worm wheel 21 that meshes with the worm gear 20. The speed reducer 19 is housed in a gear housing 22 that is a transmission mechanism housing.

Hereinafter, the reduction ratio (gear ratio) of the speed reducer 19 is sometimes expressed as N. The reduction ratio N is defined as the ratio ($\theta_{wg}/\theta_{ww}$) of a worm gear angle $\theta_{wg}$, namely the rotation angle of the worm gear 20, to a worm wheel angle $\theta_{ww}$, namely the rotation angle of the worm wheel 21.

The worm gear 20 is rotationally driven by the electric motor 18. The worm wheel 21 is connected to the output shaft 9 so as to be rotatable with the output shaft 9.

When the worm gear 20 is rotationally driven by the electric motor 18, the worm wheel 21 is rotationally driven, so that motor torque is applied to the steering shaft 6, and the steering shaft 6 (output shaft 9) rotates. The rotation of the steering shaft 6 is transmitted to the pinion shaft 13 via the intermediate shaft 7. Rotation of the pinion shaft 13 is converted to axial movement of the rack shaft 14. The steered wheels 3 are thus steered. That is, rotationally driving the worm gear 20 by the electric motor 18 allows steering assistance by the electric motor 18 and steering of the steered wheels 3. The electric motor 18 is provided with a rotation angle sensor 23 for detecting the rotation angle of a rotor of the electric motor 18.

The torque that is applied to the output shaft 9 (example of the object to be driven by the electric motor 18) includes motor torque from the electric motor 18 and disturbance torque $T_{lc}$ other than the motor torque. The disturbance torque $T_{lc}$ other than the motor torque includes steering torque $T_d$, road load torque (road reaction torque) $T_{rl}$, and friction torque $T_f$.

The steering torque $T_d$ is torque that is applied from the steering wheel 2 side to the output shaft 9 due to a force that is applied to the steering wheel 2 by the driver, a force that is generated by steering inertia, etc.

The road load torque $T_{rl}$ is torque that is applied from the steered wheel 3 side to the output shaft 9 via the rack shaft 14 due to self-aligning torque that is generated by a tire, a force that is generated by suspension and tire wheel alignment, a frictional force of the rack and pinion mechanism, etc.

The vehicle is equipped with a CCD (Charge Coupled Device) camera 25 that captures an image of the road ahead in the direction of travel of the vehicle, a GPS (Global Positioning System) 26 that detects the location of the vehicle, a radar 27 that detects a road shape and obstacles, and a map information memory 28 storing map information. The vehicle is further equipped with three mode switches 31, 32, and 33 for manually switching the steering mode.

As will be described later, the steering modes include a manual steering mode in which steering is performed by manual driving, an automatic steering mode in which steering is performed by autonomous driving, and a cooperative steering mode in which steering can be performed based on both manual driving and autonomous driving. More specific definitions of these steering modes will be described later.

The CCD camera 25, the GPS 26, the radar 27, and the map information memory 28 are connected to a host ECU (ECU: Electronic Control Unit) 201 for performing driver assistance control and autonomous driving control. The host ECU 201 performs surrounding environment recognition, vehicle self-localization, route planning, etc. based on information obtained by the CCD camera 25, the GPS 26, and the radar 27 and the map information, and determines control target values for steering and drive actuators.

In the present embodiment, the host ECU 201 sets an automatic steering command value $\theta_{adac}$ for automatic steering. In the present embodiment, an automatic steering control is, for example, a control for causing the vehicle to travel along a target trajectory. The automatic steering command value $\theta_{adac}$ is a target value of the steering angle for causing the vehicle to travel autonomously along a target trajectory. Since a process of setting such an automatic steering command value $\theta_{adac}$ is well known, detailed description will be omitted. The automatic steering control (driver assistance control) may be, for example, a lane keeping assist (LKA) control for keeping the vehicle within its lane.

The host ECU 201 generates mode setting signals S1, S2, and S3 according to the operations of the mode switches 31, 32, and 33. Specifically, when the first mode switch 31 is turned on by the driver, the host ECU 201 outputs a manual steering mode setting signal S1 for setting the steering mode to the manual steering mode. When the second mode switch 32 is turned on by the driver, the host ECU 201 outputs an automatic steering mode setting signal S2 for setting the steering mode to the automatic steering mode. When the third mode switch 33 is turned on by the driver, the host ECU 201 outputs a cooperative steering mode setting signal S3 for setting the steering mode to the cooperative steering mode. The mode setting signals S1, S2, and S3 are examples of the "switching signal" in the present invention.

The automatic steering command value $\theta_{adac}$ and the mode setting signals S1, S2, and S3 that are set by the host ECU 201 are provided to a motor control ECU 202 via an in-vehicle network. The steering torque $T_d$ detected by the torque sensor 12 and an output signal of the rotation angle sensor 23 are input to the motor control ECU 202. The motor control ECU 202 controls the electric motor 18 based on these input signals and information provided from the host ECU 201.

Figure 2:
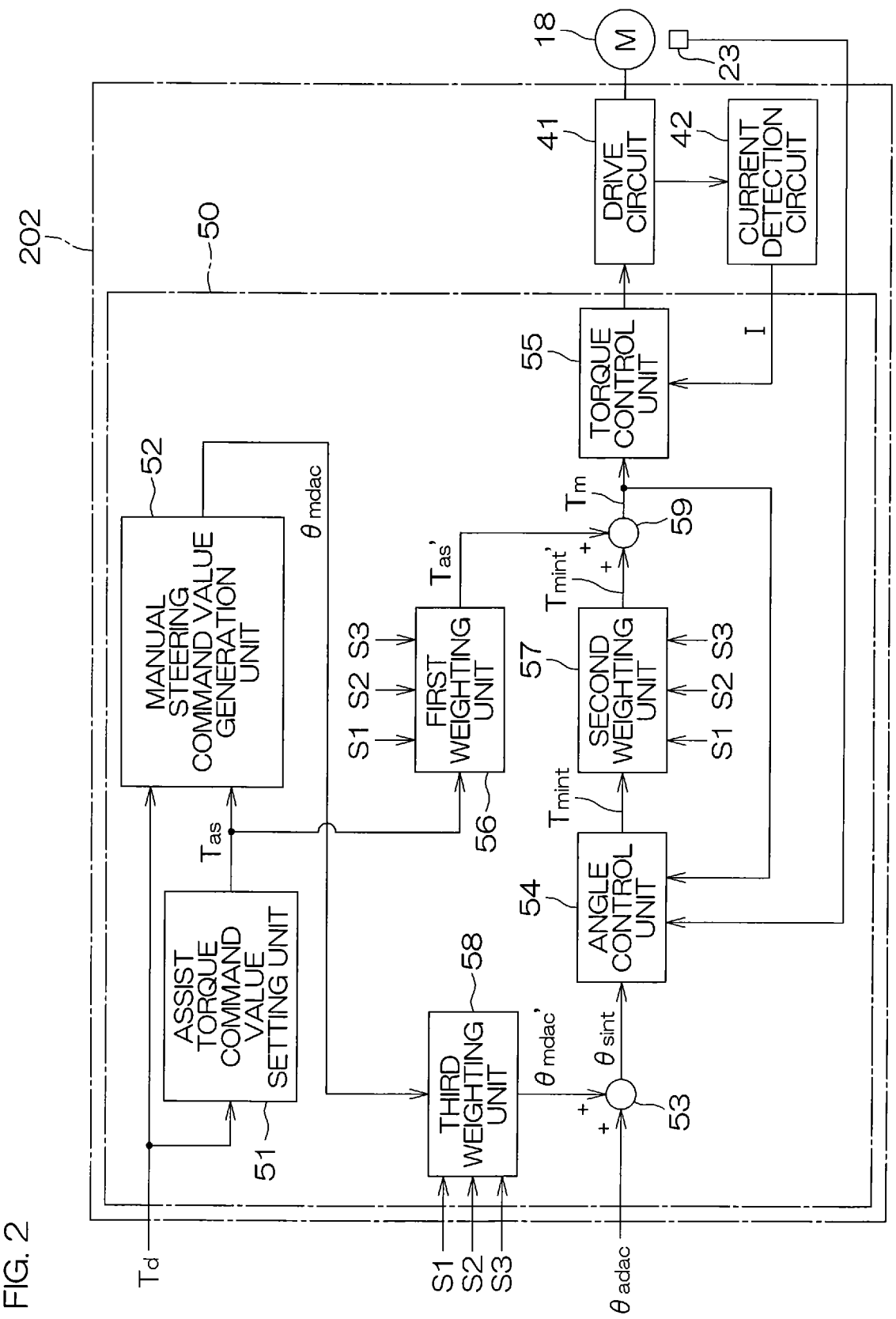
FIG. 2 is a block diagram illustrating an electrical configuration of a motor control ECU.

FIG. 2 is a block diagram illustrating an electrical configuration of the motor control ECU 202.

The motor control ECU 202 includes a microcomputer 50, a drive circuit (inverter circuit) 41 that is controlled by the microcomputer 50 and supplies electric power to the electric motor 18, and a current detection circuit 42 for detecting a current flowing through the electric motor 18 (hereinafter referred to as "motor current I").

The microcomputer 50 includes a CPU and a memory (ROM, RAM, nonvolatile memory, etc.), and functions as a plurality of functional processing units by executing a predetermined program. This plurality of functional processing units includes an assist torque command value setting unit 51, a manual steering command value generation unit 52, an integrated angle command value calculation unit 53, an angle control unit 54, a torque control unit (current control unit) 55, a first weighting unit 56, a second weighting unit 57, a third weighting unit 58, and an addition unit 59. In the present embodiment, the first weighting unit 56, the second weighting unit 57, and the addition unit 59 are an example of the "switching unit" in the present invention. The first weighting unit 56, the second weighting unit 57, the third weighting unit 58, and the addition unit 59 are an example of the "switching unit" in the present invention. The addition unit 59 is an example of the "motor torque command value calculation unit" in the present invention.

Figure 3:
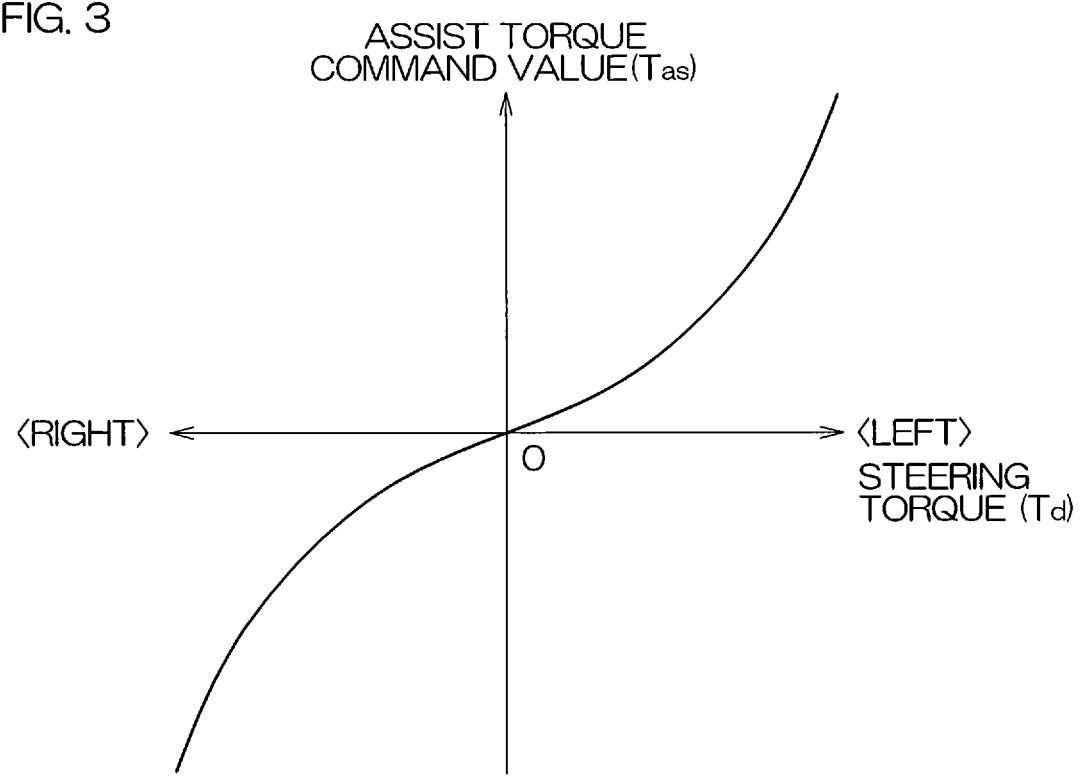
FIG. 3 is a graph showing an example of setting an assist torque command value $T_{as}$ with respect to steering torque $T_d$.

The assist torque command value setting unit 51 sets an assist torque command value $T_{as}$ that is a target value of the assist torque necessary for a manual operation. The assist torque command value setting unit 51 sets the assist torque command value $T_{as}$ based on the steering torque $T_d$ detected by the torque sensor 12. An example of setting the assist torque command value $T_{as}$ with respect to the steering torque $T_d$ is shown in FIG. 3.

The assist torque command value $T_{as}$ is set to a positive value when the electric motor 18 should generate a steering assist force for steering to the left, and is set to a negative value when the electric motor 18 should generate a steering assist force for steering to the right. The assist torque command value $T_{as}$ is positive for a positive value of the steering torque $T_d$, and is negative for a negative value of the steering torque $T_d$. The assist torque command value $T_{as}$ is set so that its absolute value increases as the absolute value of the steering torque $T_d$ increases.

The assist torque command value setting unit 51 may calculate the assist torque command value $T_{as}$ by multiplying the steering torque $T_d$ by a preset constant.

The first weighting unit 56 performs a first weighting process on the assist torque command value $T_{as}$ set by the assist torque command value setting unit 51, according to the received mode setting signal. Specifically, when one of the mode setting signals S1, S2, and S3 is received, the first weighting unit 56 first sets a first weight $W_1$ according the current steering mode and the received mode setting signal. Next, the first weighting unit 56 multiplies the assist torque command value $T_{as}$ by the first weight $W_1$. The first weighting unit 56 then provides the multiplication value $W_1 \cdot T_{as}$ to the addition unit 59 as an assist torque command value $T_{as}'$ after the first weighting process.

The manual steering command value generation unit 52 is provided to, when the driver operates the steering wheel 2, set the steering angle (more precisely, the rotation angle $\theta$ of the output shaft 9) according to the steering wheel operation as a manual steering command value $\theta_{mdac}$. The manual steering command value generation unit 52 generates the manual steering command value $\theta_{mdac}$ using the steering torque $T_d$ detected by the torque sensor 12 and the assist torque command value $T_{as}$ set by the assist torque command value setting unit 51. The manual steering command value generation unit 52 will be described later in detail.

The third weighting unit 58 performs a third weighting process on the manual steering command value $\theta_{mdac}$ generated by the manual steering command value generation unit 52, according to the received mode setting signal. Specifically, when one of the mode setting signals S1, S2, and S3 is received, the third weighting unit 58 first sets a third weight $W_3$ according the current steering mode and the received mode setting signal. Next, the third weighting unit 58 multiplies the manual steering command value $\theta_{mdac}$ by the third weight $W_3$. The third weighting unit 58 then provides the multiplication value $W_3 \cdot \theta_{mdac}$ to the integrated angle command value calculation unit 53 as a manual steering command value $\theta_{mdac}'$ after the third weighting process.

The integrated angle command value calculation unit 53 calculates an integrated angle command value $\theta_{sint}$ by adding the manual steering command value $\theta_{mdac}'$ after the third weighting process to the automatic steering command value $\theta_{adac}$ set by the host ECU 201.

The angle control unit 54 calculates an integrated motor torque command value $T_{mint}$ according to the integrated angle command value $\theta_{sint}$, based on the integrated angle command value $\theta_{sint}$. The integrated motor torque command value $T_{mint}$ is an example of the "integrated torque command value" in the present invention. The angle control unit 54 will be described later in detail.

The second weighting unit 57 performs a second weighting process on the integrated motor torque command value $T_{mint}$, according to the received mode setting signal. Specifically, when one of the mode setting signals S1, S2, and S3 is received, the second weighting unit 57 first sets a second weight $W_2$ according the current steering mode and the received mode setting signal. Next, the second weighting unit 57 multiplies the integrated motor torque command value $T_{mint}$ by the second weight $W_2$. The second weighting unit 57 then provides the multiplication value $W_2 \cdot T_{mint}$ to the addition unit 59 as an integrated motor torque command value $T_{mint}'$ after the second weighting process.

The addition unit 59 calculates a motor torque command value $T_m$ for the electric motor 18 by adding the assist torque command value $T_{as}'$ after the first weighting process and the integrated motor torque command value $T_{mint}'$ after the second weighting process.

The torque control unit 55 drives the drive circuit 41 so that the motor torque of the electric motor 18 becomes closer to the motor torque command value $T_m$.

In the present embodiment, the manual steering command value generation unit 52 uses a reference EPS model to set the manual steering command value $\theta_{mdac}$.

Figure 4:
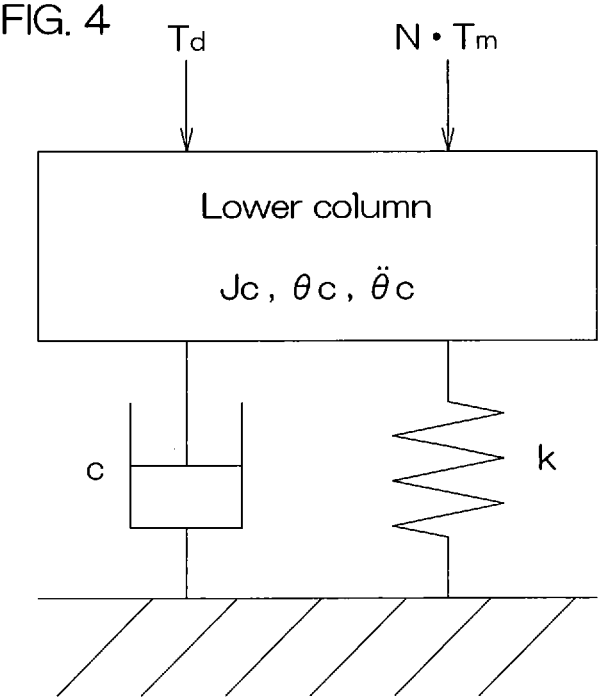
FIG. 4 is a schematic diagram showing an example of a reference EPS model that is used in a manual steering command value generation unit.

FIG. 4 is a schematic diagram showing an example of the reference EPS model that is used in the manual steering command value generation unit 52.

This reference EPS model is a single inertia model including a lower column. The lower column corresponds to the output shaft 9 and the worm wheel 21. In FIG. 4, Je is the inertia of the lower column, $\theta_c$ is the rotation angle of the lower column, and $T_d$ is the steering torque. The steering torque $T_d$, torque $N \cdot T_m$ that is applied from the electric motor 18 to the output shaft 9, and the road load torque $T_{rl}$ are applied to the lower column. The road load torque $T_{rl}$ is given by the following expression (1) using a spring constant k and a viscous damping coefficient c.

$$T_{rl} = -k \cdot \theta_c - c(d\theta_c/dt) \quad (1)$$

In the present embodiment, the spring constant k and the viscous damping coefficient c are set to predetermined values obtained in advance through experiments, analysis, etc.

An equation of motion of the reference EPS model is given by the following expression (2).

$$J_c \cdot d^2\theta_c/dt^2 = T_d + N \cdot T_m - k \cdot \theta_c - c(d\theta_c/dt) \quad (2)$$

The manual steering command value generation unit 52 calculates the rotation angle $\theta_c$ of the lower column by solving the differential equation represented by the expression (2) by substituting the steering torque $T_d$ detected by the torque sensor 12 for $T_d$ and substituting the assist torque command value $T_{as}$ set by the assist torque command value setting unit 51 for $N \cdot T_m$. The manual steering command value generation unit 52 generates the obtained rotation angle $\theta_c$ of the lower column as the manual steering command value $\theta_{mdac}$.

Figure 5:
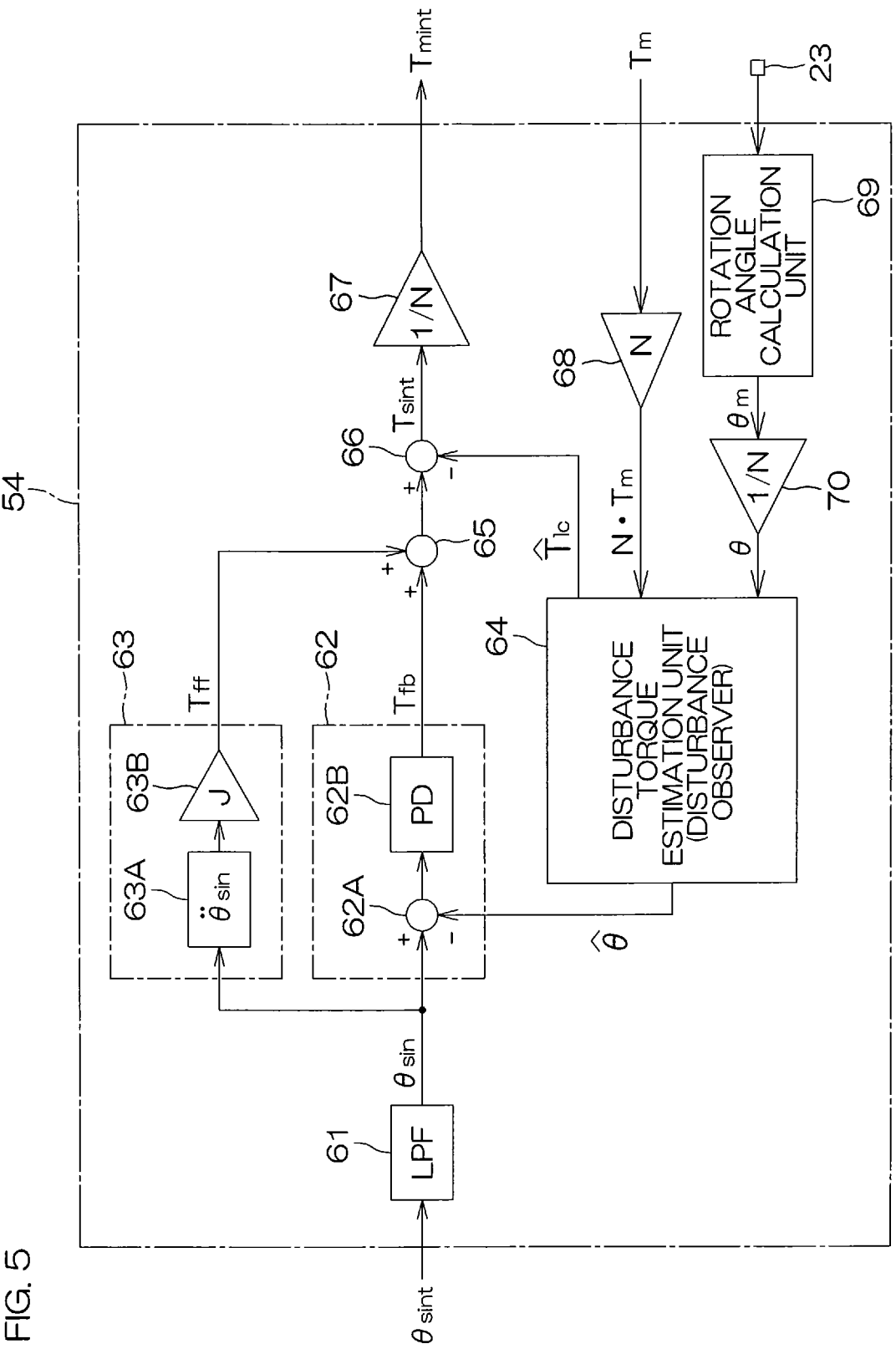
FIG. 5 is a block diagram showing the configuration of an angle control unit.

FIG. 5 is a block diagram showing the configuration of the angle control unit 54.

The angle control unit 54 calculates the integrated motor torque command value $T_{mint}$ based on the integrated angle command value $\theta_{sint}$. The angle control unit 54 includes a low-pass filter (LPF) 61, a feedback control unit 62, a feedforward control unit 63, a disturbance torque estimation unit 64, a torque addition unit 65, a disturbance torque compensation unit 66, a first reduction ratio division unit 67, a reduction ratio multiplication unit 68, a rotation angle calculation unit 69, and a second reduction ratio division unit 70.

The reduction ratio multiplication unit 68 converts the motor torque command value $T_m$ calculated by the addition unit 59 (see FIG. 2) to an output shaft torque command value $N \cdot T_m$ to be applied to the output shaft 9 (worm wheel 21) by multiplying the motor torque command value $T_m$ by the reduction ratio N of the speed reducer 19.

The rotation angle calculation unit 69 calculates a rotor rotation angle $\theta_m$ of the electric motor 18 based on an output signal of the rotation angle sensor 23. The second reduction ratio division unit 70 converts the rotor rotation angle $\theta_m$ calculated by the rotation angle calculation unit 69 to the rotation angle (actual steering angle) $\theta$ of the output shaft 9 by dividing the rotor rotation angle $\theta_m$ by the reduction ratio N.

The low-pass filter 61 performs a low-pass filtering process on the integrated angle command value $\theta_{sint}$. An integrated angle command value $\theta_{sin}$ after the low-pass filtering process is provided to the feedback control unit 62 and the feedforward control unit 63.

The feedback control unit 62 is provided to control an estimated steering angle value $\hat{\theta}$ calculated by the disturbance torque estimation unit 64 toward the integrated angle command value $\theta_{sin}$ after the low-pass filtering process. The feedback control unit 62 includes an angle deviation calculation unit 62A and a PD control unit 62B. The angle deviation calculation unit 62A calculates a deviation $\Delta\theta$ ($=\theta_{sin}-\hat{\theta}$) between the integrated angle command value $\theta_{sin}$ and the estimated steering angle value $\hat{\theta}$. The angle deviation calculation unit 62A may calculate, as the angle deviation $\Delta\theta$, a deviation ($\theta_{sin}-\theta$) between the integrated angle command value $\theta_{sin}$ and the actual steering angle $\theta$ calculated by the second reduction ratio division unit 70.

The PD control unit 62B calculates feedback control torque $T_{fb}$ by performing a PD calculation (proportional-derivative calculation) for the angle deviation $\Delta\theta$ calculated by the angle deviation calculation unit 62A. The feedback control torque $T_{fb}$ is provided to the torque addition unit 65.

The feedforward control unit 63 is provided to compensate for a delay in response due to the inertia of the electric power steering system 1 and improve control response. The feedforward control unit 63 includes an angular acceleration calculation unit 63A and an inertia multiplication unit 63B. The angular acceleration calculation unit 63A calculates a target angular acceleration $d^2\theta_{sin}/dt^2$ by obtaining the second derivative of the integrated angle command value $\theta_{sin}$.

The inertia multiplication unit 63B calculates feedforward control torque $T_{ff}$ ($=J \cdot d^2\theta_{sin}/dt^2$) by multiplying the target angular acceleration $d^2\theta_{sin}/dt^2$ calculated by the angular acceleration calculation unit 63A by the inertia J of the electric power steering system 1. The inertia J is obtained from, for example, a physical model of the electric power steering system 1 (see FIG. 6) that will be described later. The feedforward control torque $T_{ff}$ is provided to the torque addition unit 65 as an inertia compensation value.

The torque addition unit 65 calculates a basic torque command value ($T_{fb}+T_{ff}$) by adding the feedforward control torque $T_{ff}$ to the feedback control torque $T_{fb}$.

The disturbance torque estimation unit 64 is provided to estimate nonlinear torque (disturbance torque: torque other than the motor torque) that is generated as disturbance in a plant (controlled object of the electric motor 18). The disturbance torque estimation unit 64 estimates the disturbance torque (disturbance load) $T_{lc}$, the steering angle $\theta$, and a steering angle derivative (angular velocity) $d\theta/dt$ based on the output shaft torque command value $N \cdot T_m$ and the actual steering angle $\theta$. The estimated values of the disturbance torque $T_{lc}$, the steering angle $\theta$, and the steering angle derivative (angular velocity) $d\theta/dt$ are given by $\hat{T}_{lc}$, $\hat{\theta}$, and $d\hat{\theta}/dt$, respectively. The disturbance torque estimation unit 64 will be described later in detail.

The estimated disturbance torque value $\hat{T}_{lc}$ calculated by the disturbance torque estimation unit 64 is provided to the disturbance torque compensation unit 66 as a disturbance torque compensation value. The estimated steering angle value $\hat{\theta}$ calculated by the disturbance torque estimation unit 64 is provided to the angle deviation calculation unit 62A.

The disturbance torque compensation unit 66 calculates an integrated steering torque command value $T_{sint}$ ($=T_{fb}+$ $T_{ff}-\hat{T}_{lc}$) by subtracting the estimated disturbance torque value $\hat{T}_{lc}$ from the basic torque command value ($T_{fb}+T_{ff}$). The integrated steering torque command value $T_{sint}$ (torque command value for the output shaft 9) with the disturbance torque compensated for is thus obtained.

The integrated steering torque command value $T_{sint}$ is provided to the first reduction ratio division unit 67. The first reduction ratio division unit 67 calculates the integrated motor torque command value $T_{mint}$ by dividing the integrated steering torque command value $T_{sint}$ by the reduction ratio N. This integrated motor torque command value $T_{mint}$ is provided to the second weighting unit 57 (see FIG. 2).

The disturbance torque estimation unit 64 will be described in detail. The disturbance torque estimation unit 64 is, for example, a disturbance observer that estimates the disturbance torque $T_{lc}$, the steering angle θ, and the angular velocity dθ/dt by using a physical model 101 of the electric power steering system 1 shown in FIG. 6.

This physical model 101 includes a plant (example of an object to be driven by the motor) 102 that includes the output shaft 9 and the worm wheel 21 fixed to the output shaft 9. The steering torque $T_d$ is applied from the steering wheel 2 to the plant 102 via the torsion bar 10, and the road load torque $T_{rl}$ is applied from the steered wheel 3 side to the plant 102.

Moreover, the output shaft torque command value N·$T_m$ is applied to the plant 102 via the worm gear 20, and the friction torque Tris also applied to the plant 102 due to the friction between the worm wheel 21 and the worm gear 20.

An equation of motion for the inertia of the physical model 101 is given by the following expression (3), where J is the inertia of the plant 102.

[Math 1]

$$J\ddot{\theta} = N \cdot T_m + T_{lc} \quad (3)$$

$$T_{lc} = T_d + T_{rl} + T_f$$

$d^2\theta/dt^2$ is an angular acceleration of the plant 102. N is the reduction ratio of the speed reducer 19. $T_{lc}$ represents the disturbance torque other than the motor torque that is applied to the plant 102. In the present embodiment, the disturbance torque $T_{lc}$ is illustrated as the sum of the steering torque $T_d$, the road load torque $T_{rl}$, and the friction torque $T_f$, but actually includes torque other than these.

Figure 6:
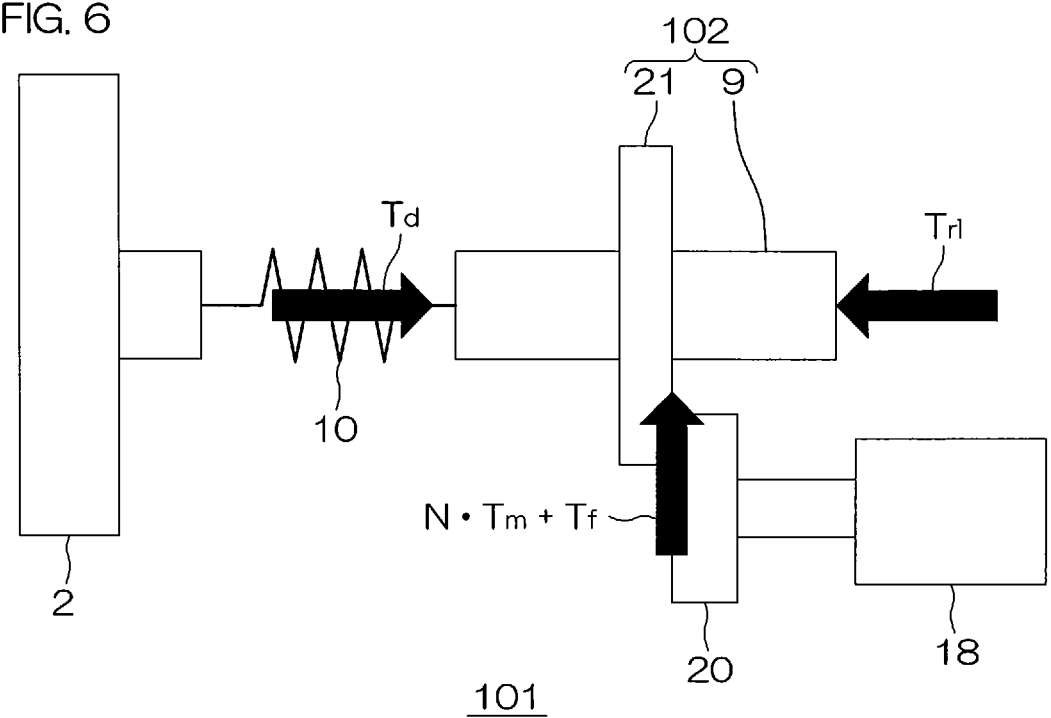
FIG. 6 is a schematic diagram showing a configuration example of a physical model of the electric power steering system.

An equation of state for the physical model 101 in FIG. 6 is given by the following expression (4).

[Math 2]

$$\begin{cases} \dot{x} = Ax + B_1 u_1 + B_2 u_2 \\ y = Cx + D u_1 \end{cases} \quad (4)$$

In the expression (4), x is a state variable vector, $u_1$ is a known input vector, $u_2$ is an unknown input vector, and y is an output vector (measured value). In the expression (4), A is a system matrix, $B_1$ is a first input matrix, $B_2$ is a second input matrix, C is an output matrix, and D is a direct feedthrough matrix.

The above equation of state is extended to a system including the unknown input vector $u_2$ as one of the states. An equation of state of the extended system (extended equation of state) is given by the following expression (5).

[Math 3]

$$\begin{cases} \dot{x}_e = A_e x_e + B_e u_1 \\ y = C_e x_e \end{cases} \quad (5)$$

In the above expression (5), $x_e$ is a state variable vector of the extended system, and is given by the following expression (6).

[Math 4]

$$x_e = \begin{bmatrix} x \\ u2 \end{bmatrix} \quad (6)$$

In the above expression (5), $A_e$ is a system matrix of the extended system, $B_e$ is a known input matrix of the extended system, and Ce is an output matrix of the extended system.

A disturbance observer (extended state observer) given by the equation represented by the following expression (7) is constructed from the extended equation of state represented by the expression (5).

[Math 5]

$$\begin{cases} \dot{\hat{x}}_e = A_e \hat{x}_e + B_e u_1 + L(y - \hat{y}) \\ \hat{y} = C_e \hat{x}_e \end{cases} \quad (7)$$

In the expression (7), $\hat{x}_e$ represents an estimated value of $x_e$. L is an observer gain. $\hat{y}$ represents an estimated value of y. $\hat{x}_e$ is given by the following expression (8).

[Math 6]

$$\hat{x}_e = \begin{bmatrix} \hat{\theta} \\ \dot{\hat{\theta}} \\ \hat{T}_{lc} \end{bmatrix} \quad (8)$$

In the expression (8), $\hat{\theta}$ is an estimated value of θ, and $\hat{T}_{lc}$ is an estimated value of $T_{lc}$.

The disturbance torque estimation unit 64 calculates the state variable vector $\hat{x}_e$ based on the expression (7).

Figure 7:
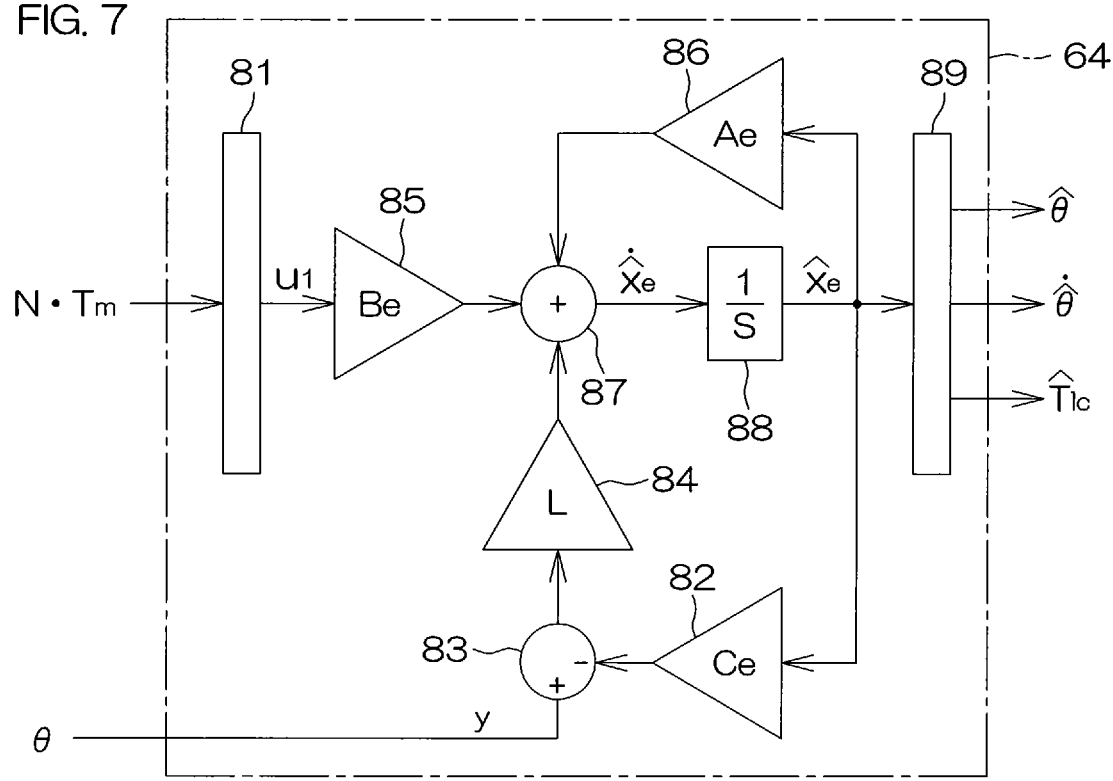
FIG. 7 is a block diagram showing the configuration of a disturbance torque estimation unit.

FIG. 7 is a block diagram showing the configuration of the disturbance torque estimation unit 64.

The disturbance torque estimation unit 64 includes an input vector input unit 81, an output matrix multiplication unit 82, a first addition unit 83, a gain multiplication unit 84, an input matrix multiplication unit 85, a system matrix multiplication unit 86, a second addition unit 87, an integration unit 88, and a state variable vector output unit 89.

The output shaft torque command value N·$T_m$ calculated by the reduction ratio multiplication unit 68 (see FIG. 5) is provided to the input vector input unit 81. The input vector input unit 81 outputs the input vector $u_1$.

The output of the integration unit 88 is the state variable vector $\hat{x}_e$ (see the expression (8)). At the start of the calculation, an initial value is given as the state variable vector $\hat{x}_e$. The initial value of the state variable vector $\hat{x}_e$ is, for example, 0.

The system matrix multiplication unit 86 multiplies the state variable vector $\hat{x}_e$ by the system matrix $A_e$. The output matrix multiplication unit 82 multiplies the state variable vector $\hat{x}_e$ by the output matrix $C_e$.

The first addition unit 83 subtracts the output ($C_e \cdot \hat{x}_e$) of the output matrix multiplication unit 82 from the output vector (measured value) y that is the actual steering angle θ calculated by the second reduction ratio division unit 70 (see FIG. 5). That is, the first addition unit 83 calculates the difference (y−ŷ) between the output vector y and the estimated output vector value ŷ (=$C_e \cdot \hat{x}_e$). The gain multiplication unit 84 multiplies the output (y−ŷ) of the first addition unit 83 by the observer gain L (see the expression (7)).

The input matrix multiplication unit 85 multiplies the input vector $u_1$ output from the input vector input unit 81 by the input matrix $B_e$. The second addition unit 87 calculates the derivative $d\hat{x}_e/dt$ of the state variable vector by adding the output ($B_e \cdot u_1$) of the input matrix multiplication unit 85, the output ($A_e \cdot \hat{x}_e$) of the system matrix multiplication unit 86, and the output (L(y−ŷ)) of the gain multiplication unit 84. The integration unit 88 calculates the state variable vector $\hat{x}_e$ by integrating the output ($d\hat{x}_e/dt$) of the second addition unit 87. The state variable vector output unit 89 calculates the estimated disturbance torque value $\hat{T}_{lc}$, the estimated steering angle value $\hat{\theta}$, and the estimated angular velocity value $d\hat{\theta}/dt$, based on the state variable vector $\hat{x}_e$.

Unlike the extended state observer described above, a typical disturbance observer is composed of an inverse model of the plant and a low-pass filter. An equation of motion of the plant is given by the expression (3) as described above. Therefore, the inverse model of the plant is given by the following expression (9).

[Math 7]

$$T_{lc} = J\ddot{\theta} - N \cdot T_m \qquad (9)$$

The inputs to the typical disturbance observer are $J \cdot d^2\theta/dt^2$ and $N \cdot T_m$. Since the second derivative of the actual steering angle θ is used, noise of the rotation angle sensor 23 has a great influence. On the other hand, the extended state observer of the above embodiment estimates the disturbance torque using integration. Therefore, the influence of noise due to differentiation can be reduced.

The typical disturbance observer composed of an inverse model of the plant and a low-pass filter may be used as the disturbance torque estimation unit 64.

Figure 8:
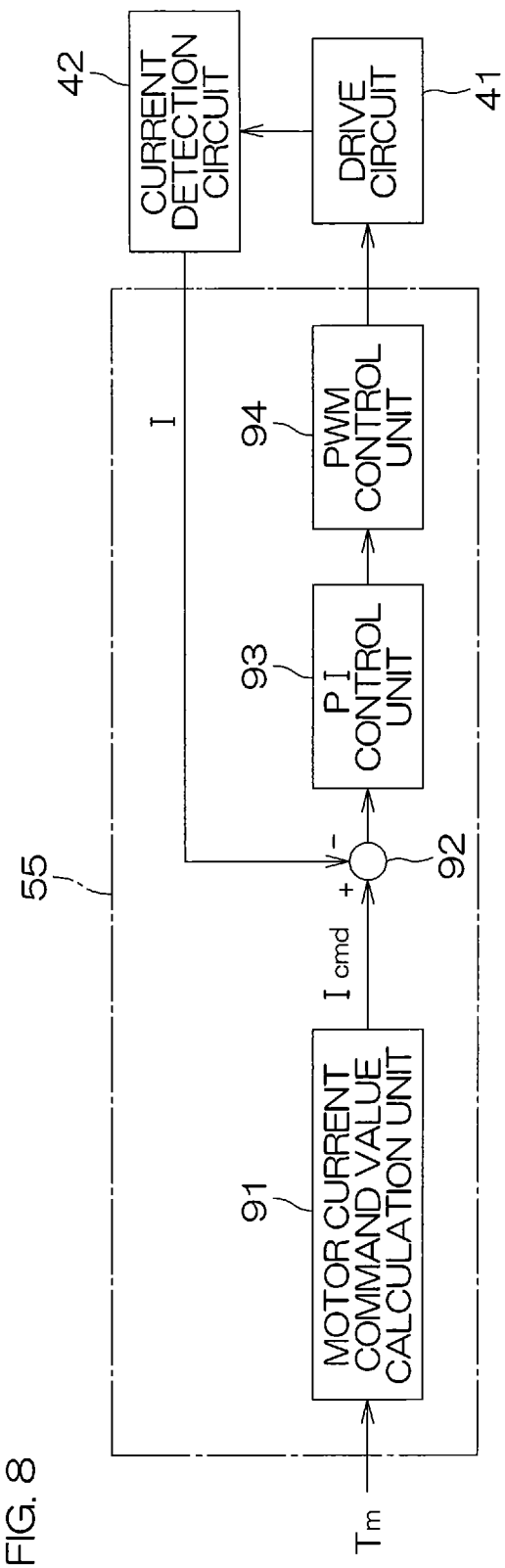
FIG. 8 is a schematic diagram showing the configuration of a torque control unit.

FIG. 8 is a schematic diagram showing the configuration of the torque control unit 55.

The torque control unit 55 (see FIG. 2) includes a motor current command value calculation unit 91, a current deviation calculation unit 92, a PI control unit 93, and a PWM (Pulse Width Modulation) control unit 94.

The motor current command value calculation unit 91 calculates a motor current command value $Ic_{md}$ by dividing the motor torque command value $T_m$ calculated by the addition unit 59 (see FIG. 2) by a torque constant $K_t$ of the electric motor 18.

The current deviation calculation unit 92 calculates a deviation $\Delta I$ (=$I_{cmd}-I$) between the motor current command value $I_{cmd}$ obtained by the motor current command value calculation unit 91 and the motor current I detected by the current detection circuit 42.

The PI control unit 93 generates a drive command value for controlling the motor current I flowing through the electric motor 18 to the motor current command value $I_{cmd}$ by performing a PI calculation (proportional-integral calculation) on the current deviation $\Delta I$ calculated by the current deviation calculation unit 92. The PWM control unit 94 generates a PWM control signal with a duty cycle corresponding to the drive command value, and supplies the PWM control signal to the drive circuit 41. Electric power corresponding to the drive command value is thus supplied to the electric motor 18.

Next, the operation of the present embodiment will be described.

The automatic steering mode refers to a steering mode in which the electric motor 18 is controlled based on the automatic steering command value $\theta_{adac}$. The manual steering mode refers to a steering mode in which the electric motor 18 is controlled based on the assist torque command value $T_{as}$. The cooperative steering mode refers to a steering mode in which the electric motor 18 is controlled based on the integrated angle command value $\theta_{sint}$ obtained by considering both the automatic steering command value $\theta_{adac}$ and the manual steering command value $\theta_{mdac}$.

When the steering mode is set to the cooperative steering mode, the first weight $W_1$ is 0, and the second weight $W_2$ and the third weight $W_3$ are 1.0.

When the steering mode is set to the automatic steering mode, the first weight $W_1$ and the third weight $W_3$ are zero, and the second weight $W_2$ is 1.0.

When the steering mode is set to the manual steering mode, the first weight $W_1$ is 1.0, the second weight $W_2$ is zero, and the third weight $W_3$ is 0 or 1.0.

That is, this motor control ECU 202 can switch the steering mode among the normal steering mode, the automatic steering mode, and the manual steering mode in response to an operation of the mode switches 31, 32, and 33 by the driver.

Figure 9:
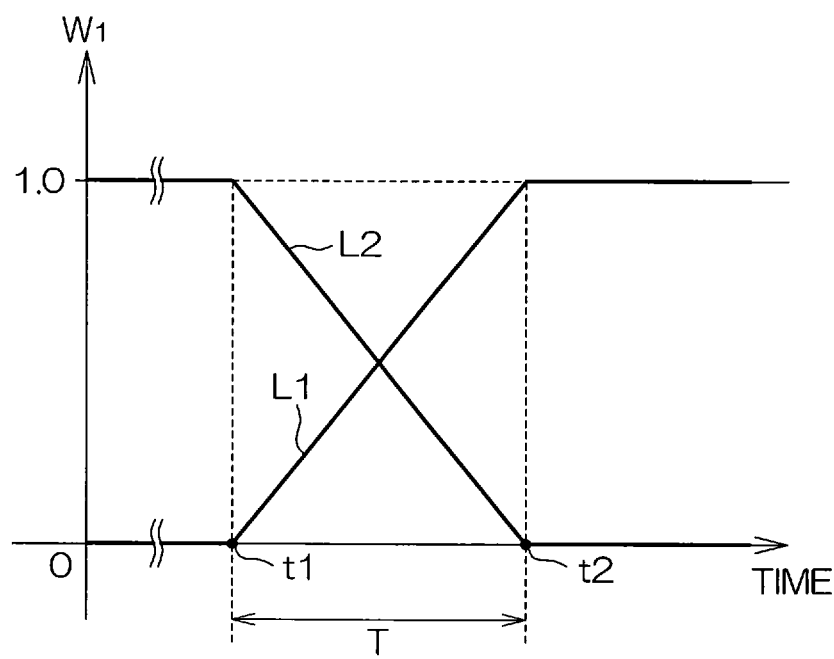
FIG. 9 is a graph showing an example of setting a first weight $W_1$ when each mode setting signal S1, S2, S3 is input.
Figure 10:
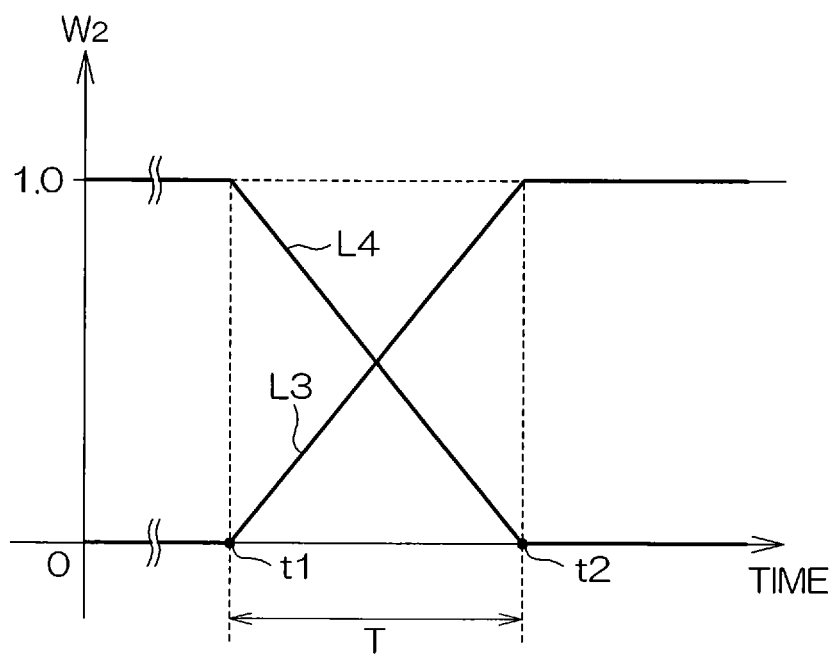
FIG. 10 is a graph showing an example of setting a second weight $W_2$ when each mode setting signal S1, S2, S3 is input.
Figure 11:
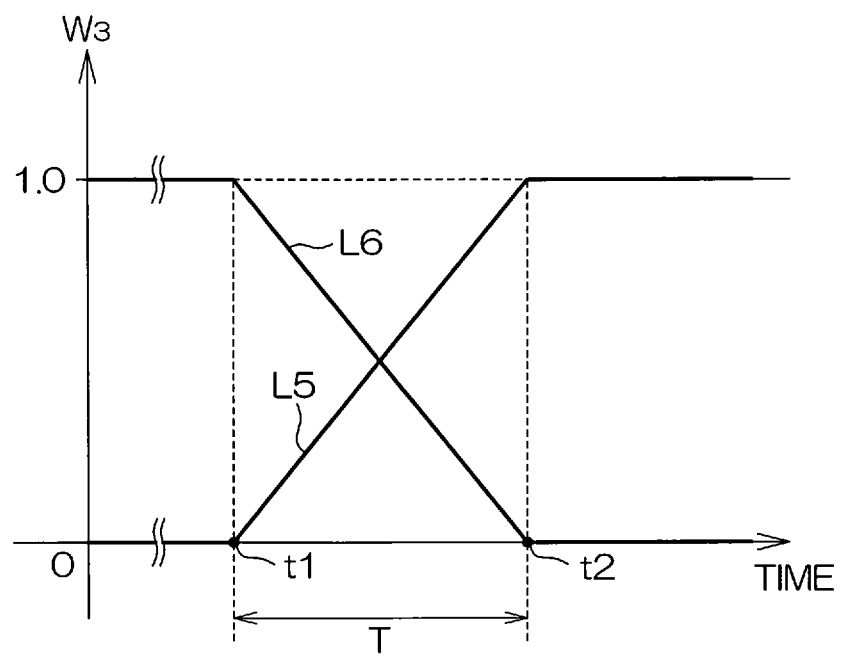
FIG. 11 is a graph showing an example of setting a third weight $W_3$ when each mode setting signal S1, S2, S3 is input.

Examples of setting the first weight $W_1$, the second weight $W_2$, and the third weight $W_3$ with the switching of the steering mode are shown in FIGS. 9, 10, and 11, respectively.

In FIG. 9, line L1 indicates the first weight $W_1$ gradually increasing from zero to 1.0 from when each mode setting signal S1, S2, S3 is input (time t1) to time t2 that is a predetermined amount of time T after time t1, and line L2 indicates the first weight $W_1$ gradually decreasing from 1.0 to zero during this period.

In FIG. 10, line L3 indicates the second weight $W_2$ gradually increasing from zero to 1.0 from time t1 to time t2, and line L4 indicates the second weight $W_2$ gradually decreasing from 1.0 to zero during from time t1 to time t2.

In FIG. 11, line L5 indicates the third weight $W_3$ gradually increasing from zero to 1.0 from time t1 to time t2, and line L6 indicates the third weight $W_3$ gradually decreasing from 1.0 to zero during from time t1 to time t2.

The absolute value of the assist torque command value $T_{as}'$ after the first weighting process, the absolute value of the integrated motor torque command value $T_{mint}'$ after the second weighting process, and the absolute value of the manual steering command value $\theta_{mdac}'$ after the third weighting process are thus gradually increased or decreased. Therefore, the switching among the steering modes is smoothly performed.

The amount of time T required to switch the first weight $W_1$, the second weight $W_2$, and the third weight $W_3$ between zero and 1.0 is set to a predetermined value obtained in advance through experiments, analysis, etc. The amount of time T required to switch the weight between zero and 1.0 may be set to vary among the first weight $W_1$, the second weight $W_2$, and the third weight $W_3$. The first weight $W_1$, the second weight $W_2$, and the third weight $W_3$ may be set to gradually increase or decrease nonlinearly rather than linearly.

In the present embodiment, when an operation of the mode switches 31, 32, and 33 that does not involve changing of the steering mode is performed, this operation is considered invalid. In the present embodiment, when any of the mode switches 31, 32, 33 is operated before the predetermined amount of time T has elapsed since each mode switch 31, 32, 33 was operated, this operation is considered invalid.

The switching of the steering mode is performed by the mode switches 31, 32, and 33. However, the host ECU 201 may switch the steering mode according to an ON/OFF signal of a driver assistance function or autonomous driving function, an obstacle(s), a driver's condition, a driver's operation such as an accelerator and brake, and the traveling state of the vehicle. In this case, the host ECU 201 generates a mode setting signal according to the ON/OFF signal of the driver assistance function or autonomous driving function, the obstacle(s), the driver's condition, the driver's operation such as an accelerator and brake, and the traveling state of the vehicle, and provides the mode setting signal to the motor control ECU 202. In this case, the mode setting signal generated by the host ECU 201 according to the ON/OFF signal of the driver assistance function or autonomous driving function, the obstacle(s), the driver's condition, the driver's operation such as an accelerator and brake, and the traveling state of the vehicle is an example of the "switching signal" in the present invention.

For example, when the lane keeping assist control for keeping the vehicle within its lane is performed, the host ECU 201 may automatically switch the steering mode as follows.

Figure 12:
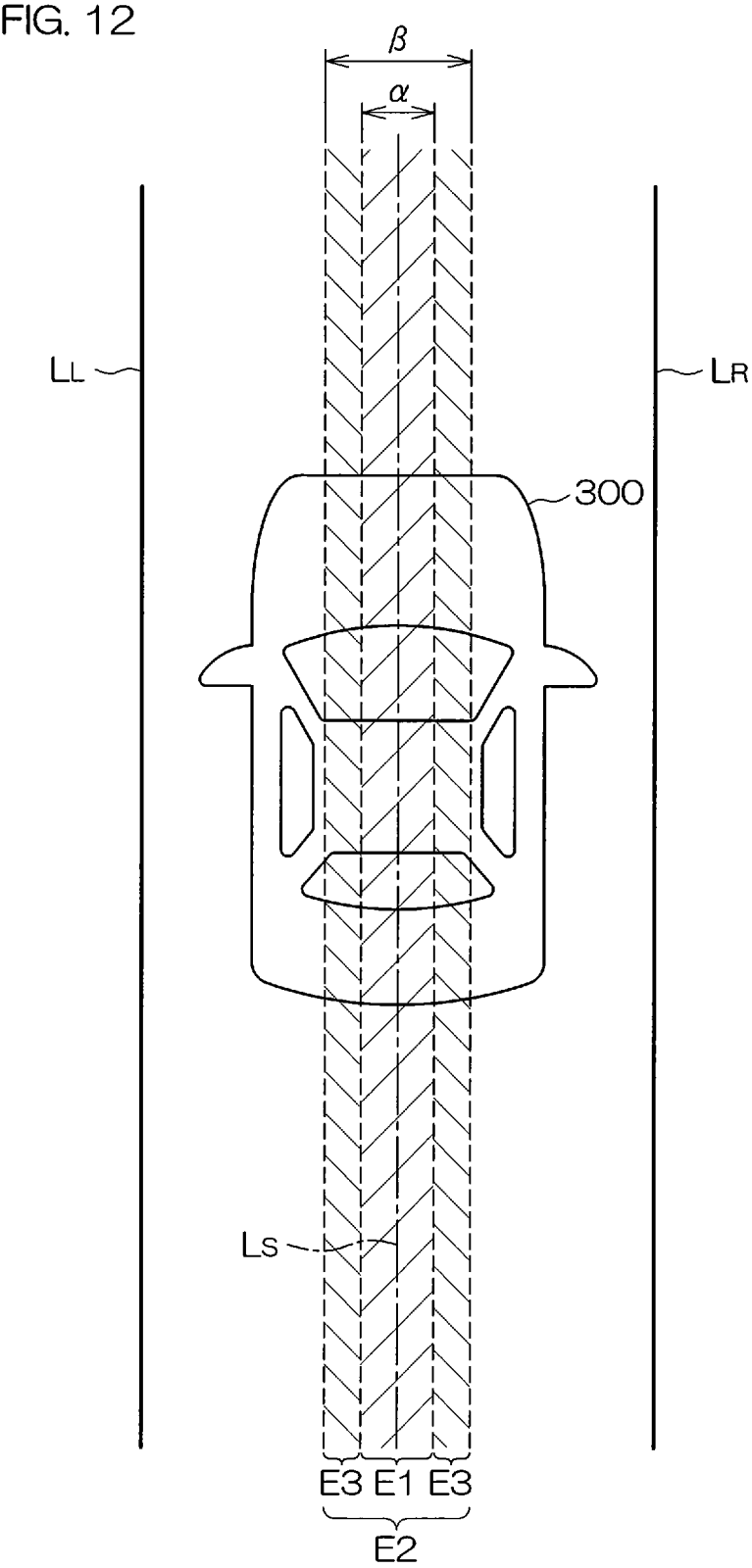
FIG. 12 is a schematic diagram showing an example in which a host ECU switches the steering mode according to the traveling state of a vehicle.

In FIG. 12, the host ECU 201 sets the steering mode to the manual steering mode when a predetermined length position at the lateral center of a vehicle 300 (hereinafter referred to as "reference position") is located within a first region E1 having a width $\alpha(\alpha>0)$ about a center line $L_S$ between lane markings $L_L$, $L_R$ as viewed in plan.

The host ECU 201 sets the steering mode to the cooperative steering mode when the reference position of the vehicle 300 is located within a third region E3 other than the first region in a second region E2 having a width $\beta(\beta>\alpha)$ about the center line $L_S$ between the lane markings $L_L$, $L_R$ as viewed in plan.

The host ECU 201 sets the steering mode to the automatic steering mode when the reference position of the vehicle 300 is located outside the second region E2 as viewed in plan.

In the above embodiment, the steering mode can be switched among the cooperative steering mode in which the electric motor 18 can be controlled based on the integrated angle command value $\theta_{sint}$, the manual steering mode in which the electric motor 18 can be controlled based on the assist torque command value $T_{as}$, and the automatic steering mode in which the electric motor 18 can be controlled based on the automatic steering command value $\theta_{adac}$.

That is, in the electric power steering system 1 that can control the electric motor 18 based on the integrated angle command value $\theta_{sint}$, the electric motor 18 can be controlled based on the assist torque command value $T_{as}$.

In the above embodiment, in the manual steering mode, the electric motor 18 is controlled based on the assist torque command value $T_{as}$. Therefore, the driver can receive the actual road load torque (road reaction torque). This allows the driver to feel the actual road surface condition such as whether the road surface is slippery. The driver is therefore less likely to feel discomfort with steering.

In the above embodiment, the basic torque command value $(T_{fb}+T_{ff})$ is calculated based on the integrated angle command value $\theta_{sint}$, and the basic torque command value $(T_{fb}+T_{ff})$ is corrected by the estimated disturbance torque value $\hat{T}_{lc}$ calculated by the disturbance torque estimation unit 64. Therefore, the influence of disturbance torque on angle control performance can be reduced. As a result, accurate angle control can be implemented.

Figure 13:
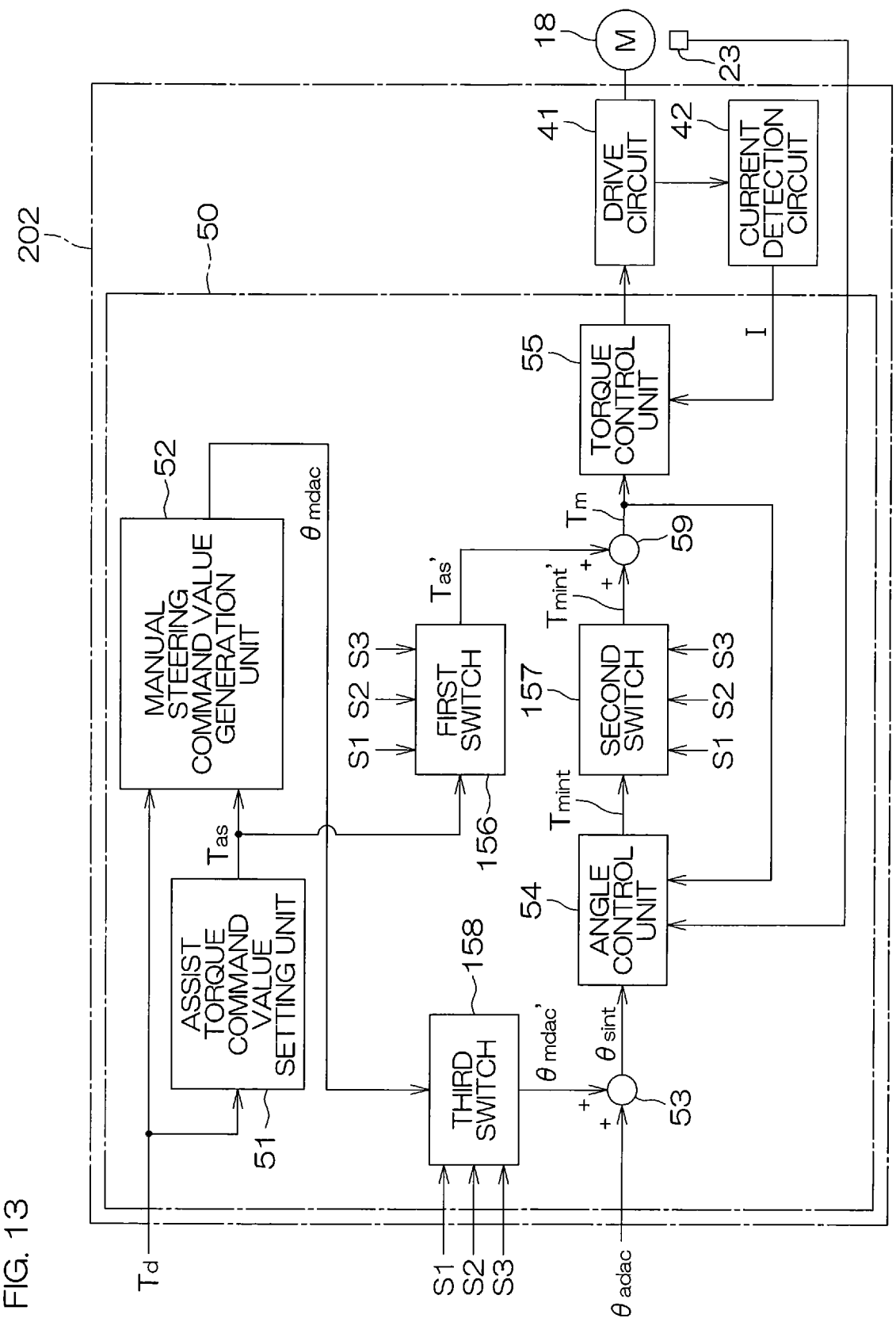
FIG. 13 is a block diagram illustrating a modification of the motor control ECU.

FIG. 13 is a block diagram illustrating a modification of the motor control ECU 202. In FIG. 13, parts corresponding to the parts in FIG. 2 described above are denoted by the same signs as those in FIG. 2.

In this motor control ECU 202, a first switch 156, a second switch 157, and a third switch 158 are provided instead of the first weighting unit 56, the second weighting unit 57, and the third weighting unit 58 of FIG. 2, respectively.

When the steering mode is set to the cooperative steering mode, the first switch 156 is turned off, and the second switch 157 and the third switch 158 are turned on.

When the steering mode is set to the automatic steering mode, the first switch 156 and the third switch 158 are turned off, and the second switch 157 is turned on.

When the steering mode is set to the manual steering mode, the first switch 156 is turned on, the second switch 157 is turned off, and the third switch 158 is turned off or on.

The first switch 156, the second switch 157, and the addition unit 59 are an example of the "switching unit" in the present invention. The first switch 156, the second switch 157, the third switch 158, and the addition unit 59 are an example of the "switching unit" in the present invention. The addition unit 59 is an example of the "addition unit" in the present invention.

Although the embodiment and modifications of the present invention are described above, the present invention may also be implemented in other forms.

In the above embodiment, the spring constant k in the expression (2) is obtained in advance through experiments, analysis, etc. However, the spring constant k in the expression (2) may be calculated based on the following expression (10) using the estimated disturbance torque value $\hat{T}_{lc}$ calculated by the disturbance torque estimation unit 64 (see FIG. 5) and the actual steering angle $\theta$ calculated by the second reduction ratio division unit 70.

$$k = \hat{T}_{lc}/\theta \quad (10)$$

In the above embodiment, the viscous damping coefficient c in the expression (2) is obtained in advance through experiments, analysis, etc.

However, the viscous damping coefficient c in the expression (2) may be calculated based on the following expression (11) using the estimated disturbance torque value $\hat{T}_{lc}$ calculated by the disturbance torque estimation unit 64 and the actual steering angle $\theta$ calculated by the second reduction ratio division unit 70.

$$c = \hat{T}_{lc}/(d\theta/dt) \quad (11)$$

In the above embodiment, the angle control unit 54 (see FIG. 5) includes the feedforward control unit 63. However, the feedforward control unit 63 may be omitted. In this case, the feedback control torque $T_{fb}$ calculated by the feedback control unit 62 is basic target torque.

In the above embodiment, the first weighting unit 56, the second weighting unit 57, and the third weighting unit 58 are provided. However, the third weighting unit 58 may be omitted. In this case, there are two types of steering modes: manual steering mode and cooperative steering mode.

Similarly, in the above modification, the first switch 156, the second switch 157, and the third switch 158 are provided. However, the third switch 158 may be omitted. In this case, there are two types of steering modes: manual steering mode and cooperative steering mode.

The above embodiment illustrates an example in which the present invention is applied to motor control for column type EPS. However, the present invention is also applicable to motor control for EPS other than the column type. The present invention is also applicable to control for an electric motor for steered angle control of a steer-by-wire system.

Although the embodiment of the present invention is described in detail above, this is only a specific example used to clarify the technical content of the present invention, and the present invention should not be construed as limited to the specific example, and the scope of the present invention is limited only by the appended claims.

DESCRIPTION OF THE REFERENCE NUMERALS

1 . . . electric power steering system, 3 . . . steered wheel, 4 . . . steering operation mechanism, 18 . . . electric motor, 51 . . . assist torque command value setting unit, 52 . . . manual steering command value generation unit, 53 . . . integrated angle command value calculation unit, 54 . . . angle control unit, 55 . . . torque control unit, 56 . . . first weighting unit, 57 . . . second weighting unit, 58 . . . third weighting unit, 59 . . . addition unit, 61 . . . low-pass filter (LPF), 62 . . . feedback control unit. 63 . . . feedforward control unit. 64 . . . disturbance torque estimation unit. 65 . . . torque addition unit. 66 . . . disturbance torque compensation unit. 156 . . . first switch. 157 . . . second switch, 158 . . . third switch

The invention claimed is:

1. A motor control device for drivingly controlling an electric motor for steering angle control, the motor control device comprising:
an assist torque command value generation unit that generates an assist torque command value using steering torque;
a manual steering command value generation unit that generates a manual steering command value using the steering torque and the assist torque command value;
an integrated angle command value calculation unit that calculates an integrated angle command value by adding the manual steering command value to an automatic steering command value; and
a switching unit that switches between a first control for controlling the electric motor based on the assist torque command value and a second control for controlling the electric motor based on the integrated angle command value, based on a switching signal.

2. The motor control device according to claim 1, wherein the switching unit includes
a first weighting unit that performs a first weighting process on the assist torque command value, based on the switching signal,
a second weighting unit that performs a second weighting process on an integrated torque command value according to the integrated angle command value, based on the switching signal, and
a motor torque command value calculation unit that calculates a motor torque command value based on the assist torque command value after the first weighting process and the integrated torque command value after the second weighting process.

3. The motor control device according to claim 1, wherein the switching unit is configured to switch among the first control, the second control, and a third control for controlling the electric motor based on the automatic steering command value, based on the switching signal.

4. The motor control device according to claim 3, wherein:
the switching unit includes
a first weighting unit that performs a first weighting process on the assist torque command value, based on the switching signal,
a second weighting unit that performs a second weighting process on an integrated torque command value according to the integrated angle command value, based on the switching signal,
a third weighting unit that performs a third weighting process on the manual steering command value, based on the switching signal, and
a motor torque command value calculation unit that calculates a motor torque command value based on the assist torque command value after the first weighting process and the integrated torque command value after the second weighting process; and
the integrated angle command value calculation unit is configured to calculate the integrated angle command value by adding the manual steering command value after the third weighting process to the automatic steering command value.

5. The motor control device according to claim 1, wherein the switching unit includes
an addition unit that calculates a motor torque command value by adding the assist torque command value generated by the assist torque command value generation unit and an integrated torque command value according to the integrated angle command value calculated by the integrated angle command value calculation unit,
a first switch that is located between the assist torque command value generation unit and the addition unit and that is turned on and off based on the switching signal, and
a second switch that is located between the integrated angle command value calculation unit and the addition unit and that is turned on and off based on the switching signal.

6. The motor control device according to claim 3, wherein the switching unit includes
an addition unit that calculates a motor torque command value by adding the assist torque command value generated by the assist torque command value generation unit and an integrated torque command value according to the integrated angle command value calculated by the integrated angle command value calculation unit,
a first switch that is located between the assist torque command value generation unit and the addition unit and that is turned on and off based on the switching signal, a second switch that is located between the integrated angle command value calculation unit and the addition unit and that is turned on and off based on the switching signal, and a third switch that is located between the manual steering command value generation unit and the integrated angle command value calculation unit and that is turned on and off based on the switching signal.

7. The motor control device according to claim 2, wherein:

a control unit that performs the second control includes an angle control unit that performs an angle control based on the integrated angle command value; and the angle control unit includes a basic torque command value calculation unit that calculates a basic torque command value based on the integrated angle command value, a disturbance torque estimation unit that estimates disturbance torque other than motor torque of the electric motor that acts on an object to be driven by the electric motor, and a disturbance torque compensation unit that corrects the basic torque command value by the disturbance torque.

8. The motor control device according to claim 5, wherein:

a control unit that performs the second control includes an angle control unit that performs an angle control based on the integrated angle command value; and the angle control unit includes a basic torque command value calculation unit that calculates a basic torque command value based on the integrated angle command value, a disturbance torque estimation unit that estimates disturbance torque other than motor torque of the electric motor that acts on an object to be driven by the electric motor, and a disturbance torque compensation unit that corrects the basic torque command value by the disturbance torque.

* * * * *